United States Patent [19]

Leveque

[11] 4,225,568

[45] Sep. 30, 1980

[54] PROCESS FOR THE PURIFICATION OF AN IMPURE PHOSPHORIC ACID

[75] Inventor: Alain Leveque, Paris, France

[73] Assignee: Rhone-Poulenc Industries, Paris, France

[21] Appl. No.: 9,918

[22] Filed: Feb. 6, 1979

[30] Foreign Application Priority Data

Jan. 24, 1979 [FR] France .................. 79 01751

[51] Int. Cl.$^2$ .................. C01B 25/16
[52] U.S. Cl. .................. 423/321 S
[58] Field of Search .................. 423/319, 320, 321 R, 423/321 S

[56] References Cited

U.S. PATENT DOCUMENTS

| | | | |
|---|---|---|---|
| 3,607,029 | 9/1971 | Goret et al. | 423/321 S |
| 3,993,736 | 11/1976 | Irani | 423/321 S |
| 4,018,869 | 4/1977 | Beltz et al. | 423/321 S |
| 4,041,134 | 8/1977 | Kikuchi et al. | 423/321 S |
| 4,070,443 | 1/1978 | Kikuchi et al. | 423/321 S |
| 4,108,963 | 8/1978 | Cuer et al. | 423/321 S |

FOREIGN PATENT DOCUMENTS

| | | | |
|---|---|---|---|
| 2538410 | 3/1977 | Fed. Rep. of Germany | 423/321 S |
| 1292338 | 3/1962 | France | 423/321 S |

*Primary Examiner*—O. R. Vertiz
*Assistant Examiner*—Gregory A. Heller
*Attorney, Agent, or Firm*—Burns, Doane, Swecker & Mathis

[57] ABSTRACT

An organic phase including both phosphoric acid and sulfuric acid is purified of sulfate ion content by countercurrently washing same with an aqueous liquid in an at least two-stage wash zone, the pH of which having been adjusted with an alkali metal or ammonium compound to a value greater than that as would exist if the washing were effected with the aqueous liquid alone, under the same conditions, and whereby there results a purified organic phase comprising both $SO_4$ and $P_2O_5$ in an amount by weight of $SO_4$ to $P_2O_5$ of less than 50 ppm.

22 Claims, 1 Drawing Figure

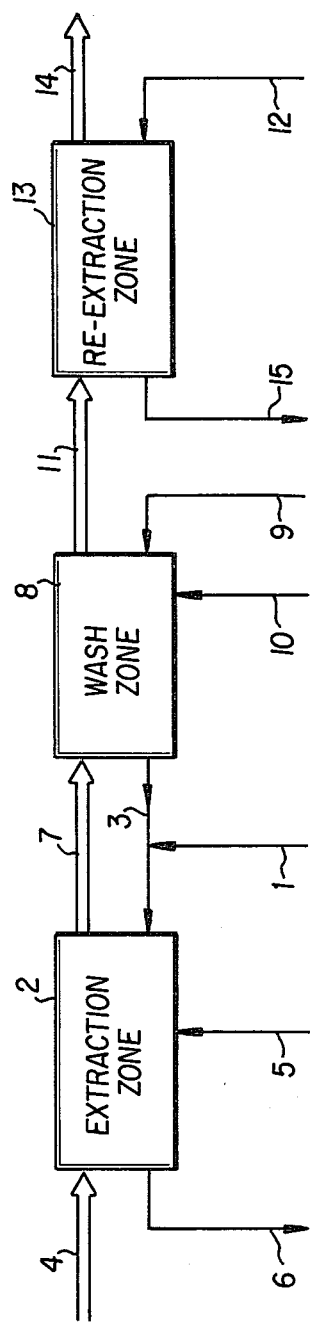

PROCESS FOR THE PURIFICATION OF AN IMPURE PHOSPHORIC ACID

BACKGROUND OF THE INVENTION

1. Field of the Invention

The present invention relates to the purification of impure phosphoric acid, and, more especially, relates to the sulfate ion removal from a raw acid to obtain a food grade phosphate having a sulfate ion content, by weight, of less than 50 ppm based upon the weight of the $P_2O_5$.

2. Description of the Prior Art

It is known to this art to effect production of purified phosphoric acid or purified phosphate by [1] the strong acid attack, e.g., sulfuric acid attack, upon phosphate rock, [2] extraction of the raw liquor thus obtained by means of an organic phase for the extraction of the phosphoric acid, said organic phase typically including a $C_4$ to $C_8$ alkyl phosphate or aliphatic alcohol, [3] followed by the re-extraction of the organic phase with either water or an aqueous solution, optionally after washing with water. Typically, an excess of sulfuric acid is utilized for the attack upon the phosphoric rock and, in addition, it may be advisable to extract the phosphoric acid from the raw liquor in the organic phase by adding sulfuric acid to the extraction installation, as described in U.S. Pat. No. 3,607,029, in order to improve the phase transfer of the phosphoric acid and, thus, the yield of extraction. If this be done, however, the organic phase containing the phosphoric acid also contains a not insignificant amount of sulfuric acid. Subsequently, the noted organic phase is usually washed with water, ultimately followed by re-extraction of the phosphoric acid with water or an aqueous alkaline phase; thus is outlined a procedure whereby a phosphoric acid or a substantially pure phosphate solution, nonetheless comprising a not insignificant amount of sulfate ions, is obtained [compare also U.S. Pat. No. 3,767,769]. Consequently, utilizing those techniques set forth in the aforesaid two patents, an inadequate purity results. It would, of course, be possible to enhance the purity of the resulting product by increasing the number of washing stages, but this would result in the disadvantage of considerably increasing the size of the wash installation and the costs of manufacture.

It too has been proposed to rid the organic phase of extraction of sulfate ion, containing the phosphoric and sulfuric acids, by treating same with an aqueous solution containing phosphate and alkaline earth metal (Ca, Ba, Sr) ions, and this is the reason the sulfate ions in the aqueous phase are extracted and precipitated in the form of alkaline earth sulfates [compare U.S. Pat. No. 4,118,462, assigned to the assignee hereof].

Nonetheless, for several years, phosphoric acid or phosphates having a very low content of sulfate ion, in most cases less than 50 ppm with respect to the $P_2O_5$, have been required for human nutrition purposes.

SUMMARY OF THE INVENTION

Accordingly, a primary object of the present invention is to provide a process for the purification of an organic phase containing both phosphoric acid and sulfuric acid, comprising countercurrently washing said organic phase in a wash zone including at least two stages, with an aqueous liquid, the pH of which having been adjusted with an alkali metal or ammonium compound to a value greater than that which would prevail in said aqueous phase in said zone if the washing had been with water alone and all other conditions had been the same, and, subsequently, if desired countercurrently washing the thus purified organic phase with water in an extraction zone comprising at least one stage. As a result, a purified organic phase containing $H_3PO_4$ and $H_2SO_4$ in a $SO_4/P_2O_5$ amount by weight of less than 50 ppm, is obtained, while maintaining a very high yield of phosphoric acid recovery.

Another object of the present invention is to provide a process for the preparation of an aqueous solution of purified phosphoric acid comprising, in addition to the aforementioned stages, the re-extraction with water of the organic phase previously obtained by means of water, resulting in an aqueous phosphoric acid solution having an amount of $SO_4$ ions to $P_2O_5$, by weight, of less than 50 ppm.

Yet another object of the invention is to provide a process for the preparation of an aqueous solution of a purified alkaline metal phosphate, comprising, in addition to the aforementioned stages of purification, the re-extraction of the previously purified organic phase by means of an aqueous solution comprising alkaline ions, which results in an aqueous alkaline phosphate having an amount of $SO_4/P_2O_5$, by weight, of less than 50 ppm.

BRIEF DESCRIPTION OF THE DRAWING

The FIGURE of Drawing is a schematic diagram of apparatus suitable for carrying out the process of the invention.

DETAILED DESCRIPTION OF THE INVENTION

More particularly, according to the invention, the organic phase containing the phosphoric and sulfuric acids is obtained by preliminary extraction of the impure phosphoric acid. An "impure" phosphoric acid is hereby defined as the aqueous solution which typically results from those conventional "wet" processes involving the strong acid attack upon phosphate rock and usually contains between 20 and 60% $P_2O_5$ by weight, together with numerous other cationic impurities, such as iron, aluminum, etc., or anions such as sulfate, fluoride, etc. The impure acid may be subjected preliminary to the known treatments of defluoridizing, decoloration, concentration, calcium sulfate desaturation, removal of organic matter or minerals in suspension and the like.

The organic extraction phase comprises conventional organic solvents virtually insoluble in pure water for the extraction of phosphoric acid, such as, for example, alkyl phosphates, aliphatic alcohols substantially insoluble in water, such as the $C_4$–$C_8$ alcohols. Alternatively, the organic phase may additionally comprise an inert water-insoluble organic solvent, such as, for example, hydrocarbons of the kerosene type.

The extraction of the phosphoric acid is effected utilizing known conventional processes, in known conventional apparatus, such as batteries of mixer-settlers, packed columns, and the like, at temperatures typically between 20° and 80° C. Alternatively, it is sometimes advantageous, in order to facilitate the transfer of the phosphoric acid into the organic phase, to add concentrated sulfuric acid to the extraction installation, as described in the aforecited U.S. patents.

Following extraction and separation of the phases, the organic phase containing the phosphoric and sulfuric acids and reflecting an amount of $SO_4$ to $P_2O_5$ typically between 0.5 and 5%, and most frequently between 1 and 3%, is isolated. Such organic phase is countercurrently washed, in a wash zone comprising a plurality of stages, with an aqueous solution including an alkali metal or ammonium compound, as above described. The number of stages in the wash zone is more than one and is generally between 3 and 15. The alkali metal or ammonium compound designed to raise the pH of the wash solution in the wash zone to a value higher than that obtained by simple water washing under identical conditions, may be a compound such as, for example, an alkali metal or ammonium hydroxide, alkali metal or ammonium salt, such as a phosphate, carbonate, and the like. However, in view of possible precipitation during the recycling of the aqueous solution issuing from the wash zone into the extraction zone, and as a function of the nature of the impurities present in the impure acid, sodium compounds are particularly preferred. It is immaterial for the purposes of the process of the invention whether the alkali metal or ammonium compound be of an acid, neutral or basic nature, the same as it is immaterial whether the aqueous solution of the compound utilized for said washing be acid, neutral or basic, provided that said compound or its aqueous solution satisfy the required condition concerning the increase in the pH of the wash solution with respect to the pH value obtained by washing with water under otherwise identical conditions.

The amount of the alkali metal or ammonium compound to be contacted with the preceding organic phase is adjusted as a function of the $H_2SO_4$ content in the organic phase and may depend, alternatively, on the sulfuric acid added for extraction of the impure acid.

The parameters to be considered in the aforementioned contacting process in order to effect the desired result, comprise: the nature of the solvent or the organic phase employed and, consequently, the coefficients of distribution of the two acids; the number of stages comprising the apparatus; the amount of the alkaline compound in the aqueous wash solution; the ratio of the flow rate of said aqueous phase to that of the solvent; and, finally, the temperature. The choice of operating conditions combining these different parameters is the result of calculations well known in the art of liquid-liquid extraction.

Calculation of the amount of the alkali metal or ammonium compound necessary to attain the desired results is readily made from the equation:

$$R = [C_{(alkali\ metal\ or\ ammonium)}]/(C_{H_3PO_4} + 2C_{H_2SO_4})$$

wherein each C represents the concentration of alkali metal or ammonium ions, or of the acids present in the aqueous phase issuing from the extraction apparatus, respectively. This ratio expresses the proportion of neutralization of the strong acid values in the aqueous wash solution during the washing step and said varies, in order to attain the result desired, as a function of the solvent or organic phase employed and its value will decline as an inverse function of the number of stages in the contacting apparatus and of the flow rate of the wash solution. Inversely, a high value of R must be used when the total number of stages is low and the ratio of the extraction solvent to the aqueous solution is high. The choice of the particular conditions is not fixed and must be optimized in each particular case. Concerning more specifically tributyl phosphate, to obtain a purified organic phase having an amount of $SO_4$ to $P_2O_5$ of less than 50 ppm by weight and, for example, for a six-stage washing installation, with a ratio of organic phase to aqueous phase of 15, the R ratio must be higher than 0.05. Knowledge of the coefficients of distribution of each extraction solvent and for different values of the concentration of the two acids, makes is possible to determine the most economical conditions for the contacting. It should be understood that the higher values of the R ratio would lead to higher degrees of purity, but at the expense of the yield in purified phosphoric acid. The titer of the aqueous wash solution is not critical, provided that the aforesaid conditions are satisfied.

The temperature of the aforedescribed contacting process is not critical; however, it is typically between ambient temperature and 80° C., preferably between 40° and 70° C.

Following contacting and separation of the phases, an organic phosphoric acid phase having an amount of $SO_4$ to $P_2O_5$ of less than 50 ppm, is collected. The phosphoric acid is recovered as a function of final use, either by the re-extraction of the organic phase by means of water, followed by separation, yielding an aqueous solution of purified phosphoric acid, or neutralization by means of an aqueous alkaline solution of phosphate and alkaline ions, as described in U.S. Pat. No. 3,767,769, with the alkaline phosphate being recovered therefrom by known means. The aqueous solution issuing from the wash installation is generally added to the impure acid feed into the extraction zone.

The process of the invention yields a purified phosphoric acid reflecting a content of $SO_4$ to $P_2O_5$ of less than 50 ppm, with a high yield, generally in excess of 90% in $P_2O_5$.

In order to further illustrate the present invention and the advantages thereof, the following specific examples are given, it being understood that same are intended only as illustrative and in nowise limitative.

EXAMPLE 1

This example demonstrates the effect of neutralization with sodium hydroxide on the selectivity of tributyl phosphate with respect to phosphoric and sulfuric acids.

An organic phase comprising the following ingredients was utilized:

[i] 100 g—Tributyl phosphate (6% water saturation)
[ii] 15 g—$H_3PO_4$
[iii] 0.57 g—$H_2SO_4$ This phase was contacted with 10 g water.

After agitation and phase separation, the organic phase contained:

[1] 100 g—Tributyl phosphate saturated with water
[2] 11.2 g—$H_3PO_4$
[3] 0.021 g—$H_2SO_4$ and the aqueous phase contained:

[1] 10 g—Water
[2] 3.8 g—$H_3PO_4$
[3] 0.55 g—$H_2SO_4$

It will thus be seen that the amount of $SO_4$ to $P_2O_5$ in the organic phase changed from 5.25% in the impure phase to 0.26% in the washed phase, for a purification factor of 20.

An additional organic phase identical to the above, was treated with an aqueous solution containing:
[1] 10 g—Water
[2] 0.23 g—NaOH The amount of NaOH represents the neutralization of one-half of the sulfuric acid present in the initial organic phase.

After agitation and phase separation, an organic phase containing the following ingredients was recovered:
[1] 100 g—Tributyl phosphate saturated with water
[2] 11 g—$H_3PO_4$
[3] 0.08 g—$H_2SO_4$ together with an aqueous phase containing:
[1] 10 g—Water
[2] 4 g—$H_3PO_4$
[3] 0.69 g—$NaHSO_4$ It will thus be seen that the amount of $H_2SO_4$ to $P_2O_5$ in the organic phase changed from 5.25% in the impure phase to 0.13% in the washed phase, for a purification factor of 40 with respect to $H_2SO_4$. It should also be noted that the amount of NaOH utilized was insufficient to neutralize an $H_3PO_4$ fraction to monosodium phosphate. In this example, the value of R was 0.11.

EXAMPLE 2

This example demonstrates an embodiment of the invention according to the FIGURE of Drawing:

Through the inlet conduit 1, 1 $m^3$/hour of phosphoric acid of wet process origin and having the characteristics which follow, was introduced:
[i] Density at 20° C. 1.57
[ii] Contents in % by weight:
$P_2O_5$—46
$SO_4$—2.1
Na—0.57
K—0.108
$NH_4$—0.021 into an 8-stage extraction apparatus 2 which was maintained at 50° C., together with the stream 3 recycled from the wash zone 8, as more fully described, infra.

Similarly, 11 $m^3$/h hydrated tributyl phosphate were recycled from the re-extraction 13 into the extractor 2 by means of the line 4. Also, into the 5th-stage of the apparatus 2, 0.113 $m^3$/h concentrated 92% sulfuric acid were introduced via line 5. At the outlet 6 of the extractor 2, 1.05 $m^3$/h of a depleted acid having the following characteristics were collected:
[i] Density at 20° C. 1.23
[ii] Contents in % by weight:
$P_2O_5$—3.8
$SO_4$—17.2
K—0.18
Na—1.17 which effluent was recycled for additional attack on the phosphate rock, and an organic phase exiting via line 7 containing 130 g $H_3PO_4$ and 0.50 g $H_2SO_4$ per liter of pure hydrated tributyl phosphate.

The organic phase was charged, through line 7, into the wash zone 8, which zone 8 was maintained at 60° C. and which zone comprised 7-stages. In the wash zone 8, the organic phase was countercurrently washed with 0.6 $m^3$/h water fed through line 9 into the 7th-stage of the wash apparatus, and with 27 kg/h of an aqueous 50% solution of sodium hydroxide charged through the line 10 into the 6th-stage of the wash apparatus 8.

The immediately foregoing represents an especial embodiment of the wash procedure. Same ensures against possible phase entrainment due to poor efficiency of the equipment. From the point of view strictly of the sulfate ion purity, the results are practically identical to those obtained by directly feeding the wash zone 8 with a dilute 22.5 g/liter sodium hydroxide solution. The amount of the hydroxide is such that the R ratio is 0.067.

The aqueous solution exiting the wash zone through line 3 and having a pH of 0.8 was joined to the impure acid inlet 1 to define a conjoint feed means for the extractor 2. The washed organic phase exiting the wash zone 8 through the line 11 contained:
[i] 85 g—$H_3PO_4$
[ii] 0.0022 g—$H_2SO_4$ expressed per liter of pure hydrated tributyl phosphate, representing an amount of $SO_4$ ion of 35 ppm by weight, based on the weight of the $P_2O_5$.

The aforenoted organic phase was next re-extracted with 1.83 $m^3$/h water in second 8-stage extraction apparatus or re-extractor 13, same being maintained at 60° C. and the water inlet therefor being via line 12. At 14, 11 $m^3$/h of exhausted tributyl phosphate exits which was recycled to the extractor 2 via line 4, and at outlet 15 2.3 $m^3$/h of purified phosphoric acid with a concentration of 22.5% by weight expressed in $P_2O_5$ and having an amount of $SO_4$ ion to $P_2O_5$ of 35 ppm were drawn off.

As a comparison, if washing with the same solution in a wash apparatus comprising 4-stages is performed, all other conditions being equal, the effluent of said wash apparatus comprises an organic phase containing $H_2SO_4$ in a $SO_4/P_2O_5$ amount of 260 ppm. Consequently, no phosphoric acid or phosphate of food quality, having a purity greater than 50 ppm, is obtained. It is also apparent that apparatus comprising but a single stage would not yield the result desired.

However, if it is desired to obtain a result of at least 50 ppm by using the above-mentioned apparatus comprising 4-stages, it is necessary that the value selected for the R ratio of the aqueous wash solution be 0.25, but in this case the consumption of the alkaline metal or ammonium compound would be greater.

COMPARATIVE EXAMPLE 2

The apparatus of Example 2 operating under the same conditions was utilized, except that the inlet flow 10 was eliminated. Under these conditions, the aqueous phase issuing from the wash apparatus had a pH of 0.3 and the phosphoric acid issuing from 15 displayed an amount of $SO_4$ to $P_2O_5$ of 400 ppm.

EXAMPLE 3

The apparatus and the operating conditions of Example 2 were used, except that the flow 10 was eliminated and the flow g replaced by a flow consisting of a partially neutralized phosphoric acid containing 542 g/liter of $H_3PO_4$ and 47.8 g/liter of $NaH_2PO_4$, at a rate of 0.850 $m^3$/h. After re-extraction, a flow 15 of purified phosphoric acid displaying an amount of $SO_4$ to $P_2O_5$, by weight, of 32 ppm, was obtained.

While the invention has now been described in terms of various preferred embodiments and illustrated with respect to certain examples, it will be apparent to the skilled artisan that various omissions, substitutions, modifications and the like may be made without departing from the spirit of the invention. Accordingly, it is intended that the scope of the present invention be limited only by the following claims.

What is claimed is:

1. A process for the purification of wet process phosphoric acid containing sulfate ion in an amount by weight such that the ratio $SO_4/P_2O_5$ is greater than 50 ppm, comprising countercurrently liquid-liquid extracting an aqueous solution of said wet process phosphoric acid with a water-insoluble organic solvent; next, phase separating and countercurrently washing and neutralizing the organic phase effluent of said countercurrent liquid-liquid extraction, in at least two-stages, with an aqueous wash solution of a pH increasing amount of an alkali metal or ammonium compound; and thence recovering from said washed organic phase effluent purified phosphoric acid having a content of $SO_4$ to $P_2O_5$ of less than 50 ppm.

2. The process as defined by claim 1, further comprising re-extracting, with water, said washed organic phase effluent.

3. The process as defined by claim 1, wherein said aqueous solution of wet process phosphoric acid subjected to liquid-liquid extraction comprises aqueous phase recycle from said countercurrent washing.

4. The process as defined by claim 3, further comprising separately introducing concentrated sulfuric acid to said wet process phosphoric acid being subjected to the countercurrent liquid-liquid extraction.

5. The process as defined by claim 2, wherein said aqueous solution of wet process phosphoric acid subjected to liquid-liquid extraction comprises aqueous phase recycle from said countercurrent washing.

6. The process as defined by claim 5, further comprising recycling re-extracted, water-insoluble organic solvent effluent to said countercurrent liquid-liquid extraction.

7. The process as defined by claim 6, said re-extraction being in at least two-stages.

8. The process as defined by claim 7, further comprising recovering depleted wet process phosphoric acid from said countercurrent liquid-liquid extraction.

9. The process as defined by claim 5, wherein said alkali metal or ammonium compound is an acid compound selected from the group consisting of the alkali metal and ammonium salts.

10. The process as defined by claim 9, said compound being a sodium compound.

11. The process as defined by claim 9, said compound being monosodium phosphate.

12. The process as defined by claim 5, said compound being a basic compound selected from the group consisting of the alkali metal or ammonium hydroxides, carbonates and phosphates.

13. The process as defined by claim 5, said aqueous wash liquid being acidic.

14. The process as defined by claim 5, said aqueous wash liquid being basic.

15. The process as defined by claim 5, said organic phase comprising at least one water-insoluble phosphoric acid extraction solvent.

16. The process as defined by claim 15, said extraction solvent being an alkyl phosphate.

17. The process as defined by claim 15, said extraction solvent being a $C_2$–$C_8$ aliphatic alcohol.

18. The process as defined by claim 5, said washing comprising from three- to fifteen-stages.

19. The process as defined by claim 5, said washing being effected at a temperature of from 20° C. to 80° C.

20. The process as defined by claim 5, said water of re-extraction comprising alkali metal or ammonium ions.

21. The process as defined by claim 16, said organic phase comprising tributyl phosphate.

22. A process for the purification of wet process phosphoric acid containing sulfate ion in an amount by weight such that the ratio $SO_4/P_2O_5$ is greater than 50 ppm, consisting essentially of countercurrently liquid-liquid extracting an aqueous solution of 20–60% by weight $P_2O_5$ wet process phosphoric acid with a water-insoluble organic solvent; next, phase separating and countercurrently washing and neutralizing the organic phase effluent of said countercurrent liquid-liquid extraction, in at least two-stages, with an aqueous wash solution of a pH increasing amount of an alkali metal or ammonium compound; and thence recovering from said washed organic phase effluent purified phosphoric acid having a content of $SO_4$ to $P_2O_5$ of less than 50 ppm.

* * * * *